United States Patent
Magee

(10) Patent No.: US 9,628,383 B2
(45) Date of Patent: Apr. 18, 2017

(54) METHOD AND APPARATUS FOR TRANSPORTING TIME RELATED INFORMATION IN A PACKET SWITCHED NETWORK

(75) Inventor: Anthony Magee, South Milford (GB)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 279 days.

(21) Appl. No.: 13/326,038

(22) Filed: Dec. 14, 2011

(65) Prior Publication Data

US 2012/0320933 A1    Dec. 20, 2012

(30) Foreign Application Priority Data

Jun. 1, 2011 (EP) .................................... 11168530

(51) Int. Cl.
    *H04J 3/06* (2006.01)
    *H04L 12/721* (2013.01)
    *H04L 12/413* (2006.01)

(52) U.S. Cl.
    CPC ............ *H04L 45/70* (2013.01); *H04J 3/0661* (2013.01); *H04J 3/0673* (2013.01); *H04L 12/413* (2013.01); *H04J 3/0697* (2013.01)

(58) Field of Classification Search
    CPC ...... H04L 45/70; H04L 12/413; H04J 3/0661; H04J 3/0673; H04J 3/0697
    USPC ........................................................ 370/503
    See application file for complete search history.

(56) References Cited

U.S. PATENT DOCUMENTS

| | | | | |
|---|---|---|---|---|
| 5,414,704 | A * | 5/1995 | Spinney ..................... | 370/389 |
| 2007/0223459 | A1 | 9/2007 | Crowle et al. | |
| 2008/0019282 | A1 * | 1/2008 | Alaria et al. ................ | 370/252 |
| 2009/0067850 | A1 * | 3/2009 | Mizutani et al. ........... | 398/154 |
| 2009/0198832 | A1 * | 8/2009 | Shah et al. .................. | 709/239 |
| 2010/0329279 | A1 * | 12/2010 | Li et al. ...................... | 370/465 |
| 2011/0194403 | A1 * | 8/2011 | Sajassi et al. ............... | 370/217 |
| 2011/0216778 | A1 * | 9/2011 | Chung et al. ................ | 370/401 |
| 2012/0014377 | A1 * | 1/2012 | Joergensen et al. ........ | 370/352 |

FOREIGN PATENT DOCUMENTS

| EP | 2 312 775 A1 | 4/2011 |
|---|---|---|
| EP | 2 608 461 A1 | 6/2013 |

OTHER PUBLICATIONS

Magee, A., "Synchronization in Next-Generation Mobile Backhaul Networks", IEEE Communications Magazine, vol. 48, No. 10, pp. 110-116 (Oct. 1, 2010).

Perkins, C. and Schierl, T., Perkins University of Glasgow, "Rapid Synchronisation of RTP Flows", Internet Engineering Task Force (IETF), pp. 1-22 (Nov. 8, 2010).

* cited by examiner

*Primary Examiner* — Andrew Chriss
*Assistant Examiner* — Ellen Kirillova
(74) *Attorney, Agent, or Firm* — Norton Rose Fulbright US LLP

(57) ABSTRACT

A time aware device for a packet switched network comprising at least one time tag processing unit adapted to process time tag data of a predetermined time tag data field (TTDF) provided within a header of a tagged data packet (TDP) transported in said packet switched network to provide time related information reflecting a delay undergone by said tagged data packet (TDP) during its transport in said packet switched network.

17 Claims, 11 Drawing Sheets

Fig. 2B

TDP: DA | SA | E-Type=8??? | ID | Type | Source TimeStamp | Device TimeStamp | Correction Field | Traceabillity | S-TAG | C-TAG | Ether Typ | Payload | FCS

TTDF = { STS | DTS | CF }

STS: 1234, DTS: 0000, CF: 0000

Fig. 2C

TDP': DA | SA | E-Type=8??? | ID | Type | Source TimeStamp | Device TimeStamp | Correction Field | Traceabillity | S-TAG | C-TAG | Ether Typ | Payload | FCS

TTDF = { STS | DTS | CF }

STS: 1234, DTS: xxxx, CF: 1000

METHOD AND APPARATUS FOR TRANSPORTING TIME RELATED INFORMATION IN A PACKET SWITCHED NETWORK

BACKGROUND OF THE INVENTION

The invention relates to a method and an apparatus for transporting time related information in a packet switched network.

When data packets are transported over a packet switched network these data packets can experience random delays. Accordingly, it is necessary to measure packet delay variations accurately and factor these measurements into the calculations to derive a time alignment between devices of the packet switched network. A conventional way of distributing time information within a wider system is GPS (Global Positioning System). Because of possible GPS jamming the applications are migrating to alternative time distribution methods and in particular methods using Network Time Protocol (NTP) and IEEE 1588 PTP (Precision Time Protocol). Applications of the Precision Time Protocol currently aim to reach a 1 microsecond accuracy for time alignment, although future applications are already targeting sub microsecond accuracy. The Precision Time Protocol PTP specifies clock models such as boundary clock BC and transparent clock TC for distributing time within a network as well as Grandmaster and Ordinary (Slave) clocks for the origin and termination of the protocol. Transparent clocks are useful, in that they allow the effects of packet delay variation (PDV) to be mitigated and thus could be key in meeting sub nano second accuracy, however they have some disadvantages associated with the manipulation of time protocol packets in general. The operation of a Transparent clock in modifying the correction field of a packet which was not addressed to it, has been described by some as a layer violation since the time stamps and delay measurement fields in the conventional time distribution protocols are embedded within the payload of the data packet. Also the security of the system is undermined even if one sends keys to all intermediate nodes of the system to allow them to unlock the contents of the payload within the data packets. Further, there is a complexity and delay impact of identifying and modifying data fields within the payload which can affect the ultimate accuracy of the time alignment.

Accordingly, it is an object of the present invention to provide a method and an apparatus to overcome the above mentioned problems and which allow to transport time related information in a packet switched network accurately without causing any layer violations.

BRIEF SUMMARY OF THE INVENTION

The invention provides a time aware device for a packet switched network comprising
at least one time tag processing unit adapted to process time tag data of a predetermined time tag data field provided within a header of a tagged data packet transported in said packet switched network to provide time related information reflecting a delay undergone by said tagged data packet during its transport in said packet switched network.

The invention further provides a mechanism to measure and mitigate a packet delay variation by a method of devices that are not time aware and which are provided between a time aware ingress device and a time aware egress device. This mechanism can be used to create a transparent clock like solution over a wide area network such as a layer 2 VPN.

The invention further provides a network or a system comprising time aware devices each having at least one time tag processing unit adapted to process time tag data of a predetermined time tag data field provided within a header of a tagged data packet transported in said packet switched network to provide time related information reflecting a delay undergone by said tagged data packet during its transport in said packet switched network.

The time aware device for a packet switched network according to the present invention does not cause any layer violations and does avoid to unlock encrypted payload of the respective data packet thus also reducing security concerns.

A further advantage of the time aware device for a packet switched network according to the present invention is that of the time the device needs to search through the packet to find that time related information is reduced.

In consequence, the processing time within each time aware device to process the time related information is lower than in conventional devices using conventional time distribution methods.

In a possible embodiment of the time aware device according to the present invention the time tag processing unit is adapted to process time tag data of a predetermined time tag data field provided within a layer 2 Ethernet header of a tagged Ethernet packet transported in said packet switched network.

Accordingly, the time aware device according to the present invention is adapted to support any time alignment protocol layer that uses Ethernet as the layer 2 transport method.

In a possible embodiment of the time aware device according to the present invention the time tag processing unit is adapted to process time tag data of a predetermined time tag data field which comprises in a possible implementation an Ethertype field indicating the type of the Ethernet protocol of said tagged data packet,
a source time stamp field which stores a time stamp provided by a time aware master device having inserted the time tag data field into said layer 2 Ethernet header of said data packet,
a device time stamp field which stores a device time stamp of the time aware device indicating a local time of the time aware device when the data packet is received at an ingress port of said time aware device and
a correction field which stores an accumulated delay value indicating the delay undergone by said tagged data packet during its transport in said packet switched network.

In a possible embodiment of the time aware device according to the present invention a time tag processing unit of the time aware device is adapted to process time tag data of the predetermined time tag data field which further comprises a time tag identifier field and a time tag type field.

In a further possible embodiment of the time aware device according to the present invention the time tag processing unit of the time aware device is adapted to process time tag data of a predetermined time tag data field,
wherein said time tag data field further comprises a traceability field.

In a possible implementation the traceability field can comprise a hop count field which stores a hop counter incremented by any time aware device which modifies a time stamp within said time tag data field, at least one address field which stores a MAC address of the last time aware device or of all previous time aware devices which have modified a time stamp within said time tag data field, a traceability clock field for a Primary Reference Clock or Grandmaster Clock and a fault signalling field.

In a possible embodiment of the time aware device according to the present invention the time tag processing unit of the time aware device is adapted to process time tag data of a predetermined time tag data field provided within a header of said data packet,
wherein said header comprises a destination address and a source address followed directly by said time tag data field.

In a possible embodiment of the time aware device according to the present invention the time aware device comprises a local time stamp generator for generating a local time stamp which is stored by the time tag processing unit in the device time stamp field of the time tag data field of the tagged data packet received at in ingress port of said time aware device.

In a further embodiment of the time aware device according to the present invention the time tag processing unit detects a residence time of said data packet caused by an internal passage or processing of the data packet in the time aware device by comparing a local time stamp generated by the local time stamp generator of said time aware device with a device time stamp read from the device time stamp field of the tagged data packet at an egress port of said time aware device.

In a possible embodiment of the time aware device according to the present invention the time tag processing unit adds the detected residence time to the delay value stored in the correction field of the time tag data field of the respective tagged data packet.

In a possible embodiment of the time aware device according to the present invention the time aware device is a time aware master device which receives a data packet from a higher layer entity and forwards a tagged data packet to a time aware intermediate device or to a time aware slave device.

In a possible embodiment of the time aware device according to the present invention the time aware device is a time aware master device comprising a master time tag processing unit which inserts the time tag data field into the header of the received data packet and puts a time stamp derived from a master clock into the source time stamp field of the inserted time tag data field to provide the tagged data packet.

In a possible embodiment of the time aware device according to the present invention the time aware device is a time aware intermediate device which forwards a data packet received from a time aware master device or from a previous intermediate time aware device to a following intermediate time aware device or to a time aware slave device.

In a possible embodiment of the time aware device according to the present invention the time aware device is a time aware intermediate device comprising an ingress unit having an ingress time tag processing unit which checks whether a data packet received at an ingress port of said ingress unit is a tagged data packet which comprises a time tag data field in its header and stores a local ingress time stamp generated by a local time stamp generator of said ingress unit in the device time stamp field of the time tag data field if a time tag data field is provided within the header of the received tagged data packet.

In a possible embodiment of the time aware device according to the present invention the time aware intermediate device comprises an egress unit having an egress time tag processing unit which calculates a single device residence time (RT) of the tagged data packet within the time aware intermediate device depending on the ingress time stamp populated in the device time stamp (DTS) field and a local egress time stamp generated by a local time stamp generator of the egress unit and which adds the calculated single device residence time RT to the accumulated delay value stored in the correction field CF of the time tag data field TTDF of the received tagged data packet (TDP), and eventually resetting the device time stamp (DTS) field to zero.

In a possible embodiment of the time aware device according to the present invention the time aware intermediate device comprises an egress device having an egress time tag processing unit which calculates a residence time RT of the tagged data packet (TDP) within a distributed network of devices that are not time tag aware according to the current invention, by subtracting a remote ingress time stamp, transported via the device time stamp (DTS) field of said tagged data packet (TDP) from a local egress time stamp (PTS) generated by a local time stamp generator of said egress device and which adds the calculated residence time RT to the accumulated delay value stored in the correction field CF of the time tag data field TTDF of the received tagged data packet TDP, when the device time stamp DTS of the device time stamp field of the incoming data packet is not zero.

In a possible embodiment of the time aware device according to the present invention the time aware device is a time aware slave device which receives a tagged data packet from a time aware intermediate device or from a time aware master device.

In a possible embodiment of the time aware device according to the present invention the time aware device is a time aware slave device comprising a slave time tag processing unit which provides an ingress port time stamp generated by a local time stamp generator upon reception of the data packet at an ingress port of said time aware slave device.

In a possible embodiment of the time aware device according to the present invention the slave time tag processing unit of said time aware slave device checks whether the data packet received at the ingress port of said time aware slave device is a tagged data packet which comprises a time tag data field in its header.

In a possible embodiment the slave time tag processing unit of the slave time aware device processes data packets depending on whether the received data packet is a tagged data packet or not.

If the received data packet is a tagged data packet the slave time tag processing unit inserts the ingress port time stamp of the slave device into the device time stamp field of the tagged data packet in case that the time aware slave device has received a tagged data packet where the device time stamp is zero.

Otherwise, i.e. in case that the time aware slave device has received the tagged data packet with a non zero value within the device time stamp field, the slave time tagged processing unit calculates a residence time by subtracting a device time stamp from the ingress port time stamp of the slave device and adds the calculated residence time to the delay value stored in the correction field of the time tag data field of the tagged data packet received by the time aware slave device.

In a possible embodiment of the time aware slave device if the received data packet received by the time aware slave device is not a tagged data packet the data packet is forwarded directly by said slave time tag processing unit of said time aware slave device to a higher layer entity.

The invention further provides a packet switched network comprising at least one time aware master device, time aware intermediate devices and time aware slave devices.

Accordingly, the invention provides a packet switched network comprising at least one time aware master device which receives a data packet from a higher layer entity and forwards a tagged data packet to a time aware intermediate device or to a time aware slave device,
wherein said time aware master device comprises a master time tag processing unit which inserts said time tag data field into the header of the received data packet and puts a time stamp derived from a master clock into a source time stamp field of the inserted time tag data field to provide the tagged data packet,
wherein the packet switched network further comprises at least one time aware intermediate device which forwards a tagged data packet received from said time aware master device or from a previous intermediate time aware device to a following intermediate time aware device or to a time aware slave device,
wherein said packet switched network further comprises time aware slave devices, wherein each time aware slave device which receives a tagged data packet from a time aware intermediate device or from a time aware master device comprises a slave time tag processing unit which provides an ingress port time stamp generated by a local time stamp generator upon reception of the tagged data packet at an ingress port of said time aware slave device.

It is possible that the time aware slave device receives a packet that was originally sent by a time aware intermediate device but which arrives via a device which is not time tag aware. In this case the time aware slave device terminates a time unaware network.

The invention further provides a packet switched network, wherein said packet switched network is a mobile phone network having base station controllers comprising a time aware master device and base stations comprising a time aware slave device.

The invention provides a method for transporting time related information in a packet switched network having time aware devices comprising the steps of: receiving a data packet from a higher layer entity by a time aware master device which inserts a time tag data field into the header of the received data packet to provide a tagged data packet, forwarding the tagged data packet directly or via a time aware intermediate device to a time aware slave device which does process the time tag data of the time tag data field provided within the header of the tagged data packet to provide time related information reflecting a delay undergone by said tagged data packet during its transport in said packet switched network.

BRIEF DESCRIPTION OF THE DRAWINGS

In the following possible embodiments of the apparatus and method according to the present invention are described with reference to the enclosed figures in more detail.

FIG. 2A, 2B, 2C show diagrams for illustrating a data structure for a possible implementation of a time tag data field as used by a time aware device according to the present invention;

DETAILED DESCRIPTION OF THE INVENTION

Figure 1:
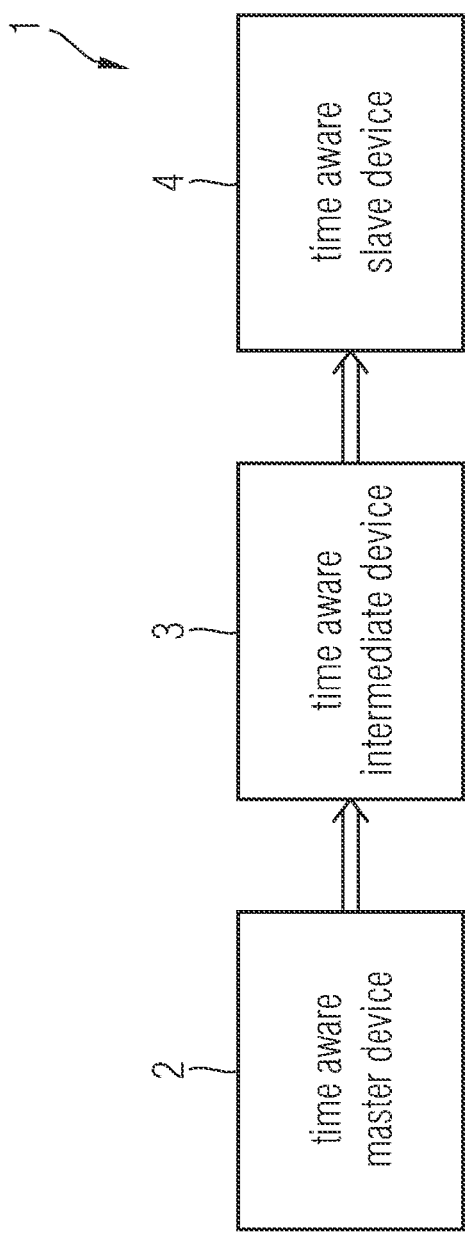
FIG. 1 shows a block diagram for illustrating a packet switched network comprising time aware devices according to the present invention.

As can be seen in FIG. 1 a packet switched network or a packet switched system 1 according to the present invention can comprise a chain of time aware devices adapted to process a data packet or a flow of data packets and in particular adapted to process time tag data of a predetermined time tag data field TTDF provided within a header of tagged data packets TDPs transported in the packet switched network 1. In the shown example of FIG. 1 the packet switched network 1 comprises a time aware master device 2 and at least one time aware intermediate device 3 as well as at least one time aware slave device 4. Each of the time aware devices 2, 3, 4 comprises at least one time tag processing unit integrated within the respective time aware device to process time tag data of a predetermined time tag data field TTDF provided within the header of each tagged data packet TDP transported within the packet switched network 1 to provide time related information reflecting a delay undergone by said tagged data packet TDP during its transport in said packet switched network 1. The time aware slave device 4 as shown in FIG. 1 is used to terminate the time tag function and to transfer data measured by means of the time tag function to a higher layer protocol like PTP. In a possible embodiment the time aware slave device 4 can map a source time stamp STS to a corresponding time stamp of PTP and the device time stamp DTS to TS2 of the PTP payload. Further the correction (CF) value can be copied from the time tag to a correction field of the PTP payload.

In a possible embodiment the packet switched network 1 can be a mobile phone network having base station controllers each comprising a time aware master device 2 as shown in FIG. 1 and base stations comprising time aware slave devices 4 as shown in FIG. 1. Accordingly, a time aware device according to the present invention can be used in a mobile telephone network system. In other possible applications the time aware device according to the present invention can be used for phase equalization in a smart grid of a power distribution network.

In a possible embodiment a time tag processing unit of each time aware device is adapted to process time tag data of a predetermined time tag data field TTDF provided within a layer 2 Ethernet header of a tagged Ethernet packet transported in the packet switched network 1 as shown in FIG. 1.

Each time aware device can comprise one or several ingress ports for receiving data packets as well as one or several egress ports for transmitting data packets to the next device.

Figure 2A:
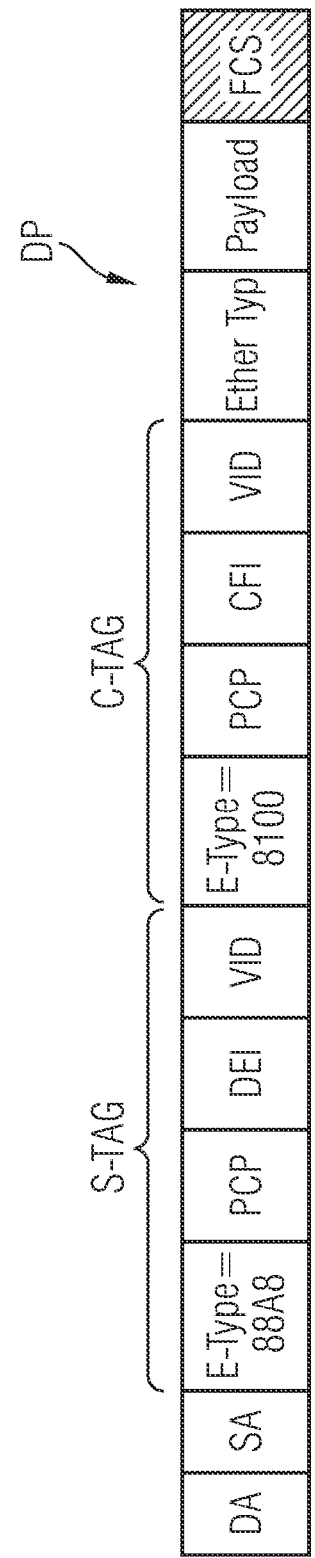

FIG. 2A, 2B, 2C show data structures illustrating the provision of a time tag data field TTDF within a header of a data packet transported within the packet switched network 1. FIG. 2A shows an exemplary data packet which has not yet been tagged with a time tag data field. The data packet as shown in FIG. 2 comprises a layer 2 header and payload data followed by a frame check sequence FCS. As shown in the example the header of the data packet comprises a destination address DA and a source address SA. The destination address DA indicates the destination address of a destination device to which the data packet is to be transported. The source address SA indicates the address of a device from which the data packet originates. The destination address DA and the source address SA are followed by tag fields and an Ethertype data field which indicates the type of Ethernet protocol used by the respective data packet. The header comprises a service tag (S-tag) comprising in the shown example a PCP, DEI and a VID field. Further, for example, a customer tag (C-tag) is shown comprising a PCP, CFI and VID field.

FIG. 2B shows a data structure of a tagged data packet comprising a time tag data field TTDF provided within the header of the data packet. The time tag data field TTDF can be inserted by a time aware master device 2 as shown in FIG. 1. The time aware master device 2 receives a data packet as shown in FIG. 2A from a higher layer entity HLE and forwards the tagged data packet as shown in FIG. 2B to other devices of the packet switched network 1, when the payload contains time related information such as that used by IEEE 1588 PTP or NTP.

The time tag data field TTDF comprises in a possible embodiment as shown in FIG. 2B an Ethertype field indicating the type of the Ethernet protocol of the tagged data packet TDP as well as a source time stamp field provided for storing a source time stamp STS. The source time stamp STS is a time stamp provided by a time aware master device 2 on the same device as a 1588 Grandmaster device or Boundary Clock with a Master port, which has inserted the time tag data field TTDF into the header of a data packet. The source time stamp STS is a local time of the time aware master device 2. In the example of FIG. 2B the source time stamp STS is a local time stamp of the inserting time aware master device 2 and has the value "1234". The time tag data field TTDF further comprises a device time stamp field with a device time stamp DTS of the respective time aware device.

The device time stamp DTS indicates a local time of a time aware device within the packet switched network 1 when the data packet has been received at an ingress port of the respective time aware device. Initially, the device time stamp DTS is set by the time aware master device 2 to "0000" as shown in FIG. 2B. The time tag data field TTDF further comprises a correction field CF which is provided for storing an accumulated delay value indicating a delay undergone by the tagged data packet TDP during its transport in the packet switched network 1. The correction field CF is used to accumulate delays and residence times RT within devices. The value of the correction field CF is initially also set to "0000" as shown in FIG. 2B.

In a possible embodiment the time tag data field TTDF can comprise further fields such as a time tag identifier field (ID) and a time tag type field (Type) as shown in FIG. 2B. The time tag ID field can support one time domain per ID range 0-4095. The time tag type field can describe support for different protocols and clock types including NTP, PTP BC, PTP E2E TC, PTP P2P TC and is extensible for future use. It is possible to incorporate T-tag subtypes for example for different delay measurement techniques used by the system.

The source time stamp STS indicates the local time provided by the time aware master device 2 having inserted the time tag data field into the layer 2 Ethernet header, i.e. a Grandmaster Clock or last Boundary Clock.

As can be seen in FIG. 2B the time tag data field TTDF can further comprise a traceability field in a possible embodiment. The traceability field can comprise a hop count field which stores a hop counter incremented by any time aware device which modifies a time stamp within the time tag data field TTDF. Further, the traceability field can include at least one address field which stores a MAC address of the last time aware device or of all previous time aware devices which have modified a time stamp within said time tag data field TTDF. Further, the traceability field can comprise a traceability clock field for a Primary Reference Clock or a Grandmaster Clock. In a possible embodiment the traceability field can further comprise a fault signalling field.

During its passage through the packet switched network 1 a time tag data field TTDF provided within the header of the transported tagged data packet TDP is processed by time tag processing units of time aware devices which the data packet passes along its way within the packet switched network 1. As can be seen in FIG. 2C the device time stamp DTS indicates a local time of the respective time aware device when the tagged data packet TDP is received at an ingress port of the respective time aware device. In the shown example the local time stamp, i.e. the device time stamp DTS is "XXXX". The correction field CF stores the accumulated value indicating the delay undergone by the tagged data packet TDD during its transport in the packet switched network 1. As shown in the example of FIG. 2B the residence time RT is e.g. "1000".

As can be seen in FIG. 2B, 2C a time tag data field TTDF follows directly the destination address DA and source address SA of the data packet. Accordingly, the time tag data field TTDF used by the present invention is in a preferred embodiment the first tag within the header to be processed by the respective device. Accordingly, delays in processing the information carried in the time tag data fields are minimal.

In a preferred embodiment each time aware device as used in the packet switched network 1 comprises a local time stamp generator for generating a local time stamp which is stored by the time tag processing unit of the respective device in the device time stamp field of the time tag data field TTDF of the time tagged data packet TDP received at an ingress port of the time aware device. In a preferred embodiment the time tag processing unit detects a residence time RT of the respective data packet caused by an internal passage and/or caused by processing the data packet in the respective time aware device by comparing a local time stamp generated by the local time stamp generator of the time aware device with a device time stamp DTS read from the device time stamp field of the tagged data packet at an egress port of the time aware device. The time tag processing unit of the respective time aware device adds the detected residence time RT to the delay value stored in the correction field CF of the time tag data field of the tagged data packet.

The time tag data field TTDF is provided at the beginning of the layer 2 header of the data packet as shown in FIG. 2B, 2C. Accordingly, the receiving time aware device receiving such a data packet can determine quickly whether the receiving data packet comprises a time tag data field TTDF or not. Accordingly, a receiving device can very easily and quickly classify if the received data packet is a tagged data packet TDP having a time tag data field TTDF as shown in FIG. 2B, 2C. Furthermore, the receiving time aware device is able to quickly access all data carried within the time tag data field TTDF of the received data packet. The receiving time aware device modifies a delay measurement or correction field CF to reflect the delay experienced by the data packet. The data carried in the time tag data field TTDF can be easily accessed and can be modified by the time aware device without having to modify internal protocol layers transported within the payload of the data packet. A further advantage is that a common time tag can be used by the devices having data fields that can be used by any time distribution protocol. Since the time tag data field TTDF sits at the beginning of the data packet any overhead associated with deep packet inspection is reduced. Furthermore, the need of a device to recalculate numerous checksums including the IP/UDP checksum within the payload of the data packet due to payload modification is removed. Accordingly, the only adjustment is that the layer 2 checksum has to be calculated. By processing the time tag data the time tag data field TTDF as explained above any layer violations are excluded. Furthermore, the need for time protocol packets to be decrypted in order to be modified can be reduced. That means that customer traffic normally transported within the payload of the data packet can be encrypted in an isolated manner from the time protocol fields.

Figure 3:
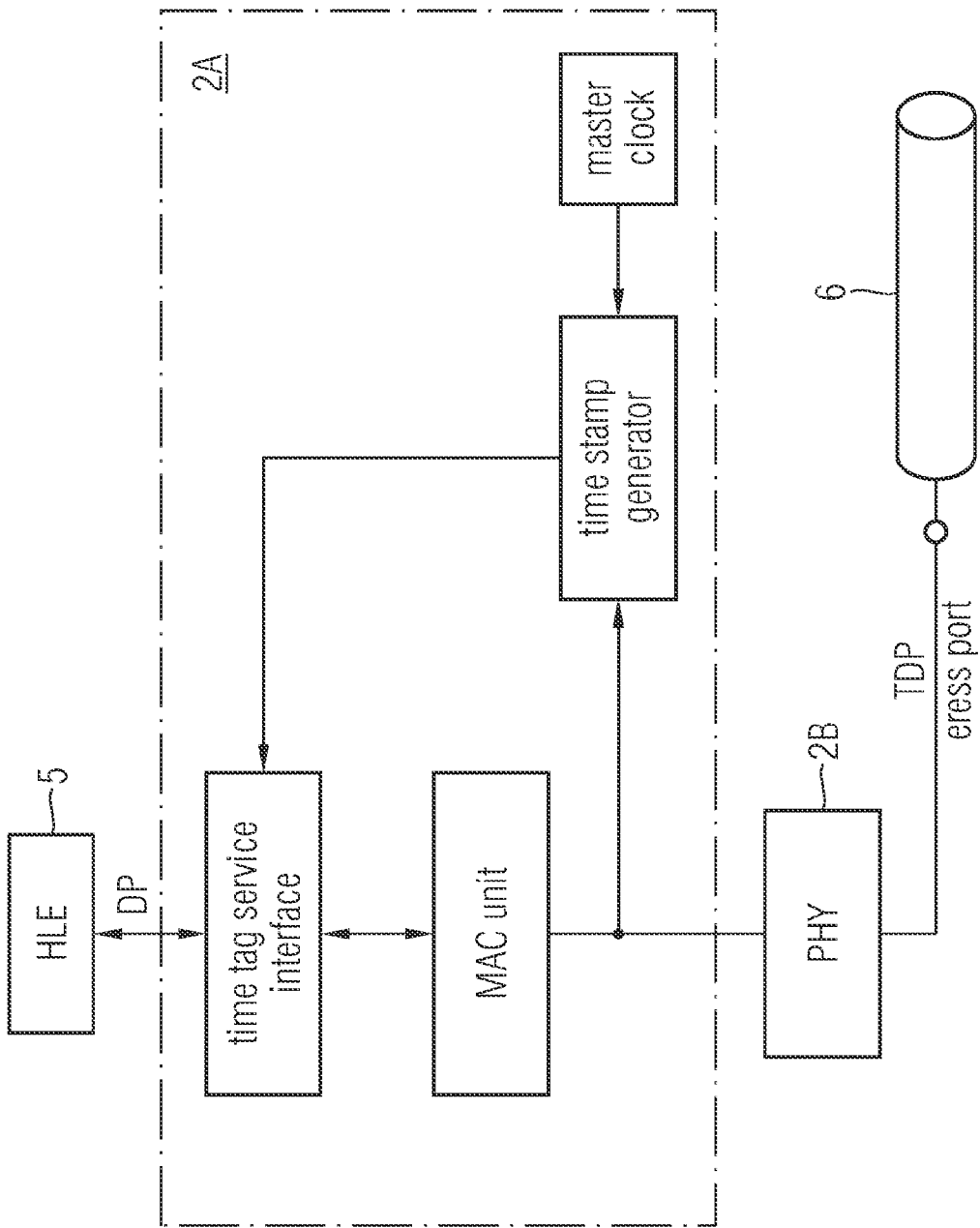
FIG. 3 shows a diagram for illustrating the placement of a time tagged data field in a time aware master device according to a possible embodiment of the present invention.

FIG. 3 shows a diagram for illustrating a time tag processing unit in a time aware master device 2 according to a possible embodiment of the present invention. The time aware master device 2 comprises a master time tag processing unit 2A which inserts a time tag data field TTDF into the header of the received data packet. The master time tag processing unit 3A receives in the shown example a data packet DP from a higher layer entity HLE 5 using a protocol such as NTP or 1588 PTP. The time aware master device 2 comprises a physical transceiver 2B connecting the master time tag processing unit 2A with an egress port of the time aware master device 2 forwarding the tagged data packet TDP via a data transport medium to a further device of the packet switched network 1. Furthermore, the time tag processing unit 2A inserts the time tag data field TTDF into the header of the received data packet DP and puts a time stamp derived from a master clock MC to the source time stamp field of the inserted time tag data fields TTDF to provide the tagged data packet TDP. The master clock MC is connected to a time stamp generator generating a local time stamp which is stored by the time tag processing unit 2A as a source time stamp STS in the source time stamp field of the time tag data field TTDF. If the network devices downstream of the Time Tag aware master device are not time tag aware, in a possible embodiment an Intermediate Egress device is provided in the event that the next time tag aware device is not a Slave device; in this case the time stamp generator feeds a time tag service interface TSI and stores the generated device time stamp inserted in the time tag data field, otherwise this is unmodified. Further, the time tag processing unit 2A comprises a MAC unit which corrects the frame check sequence FCS. The data transport medium 6 as shown in FIG. 3 is connected to the time aware master device 2 and can be any kind of data transport medium, in particular a wireless or wired data transport medium.

Figure 4:
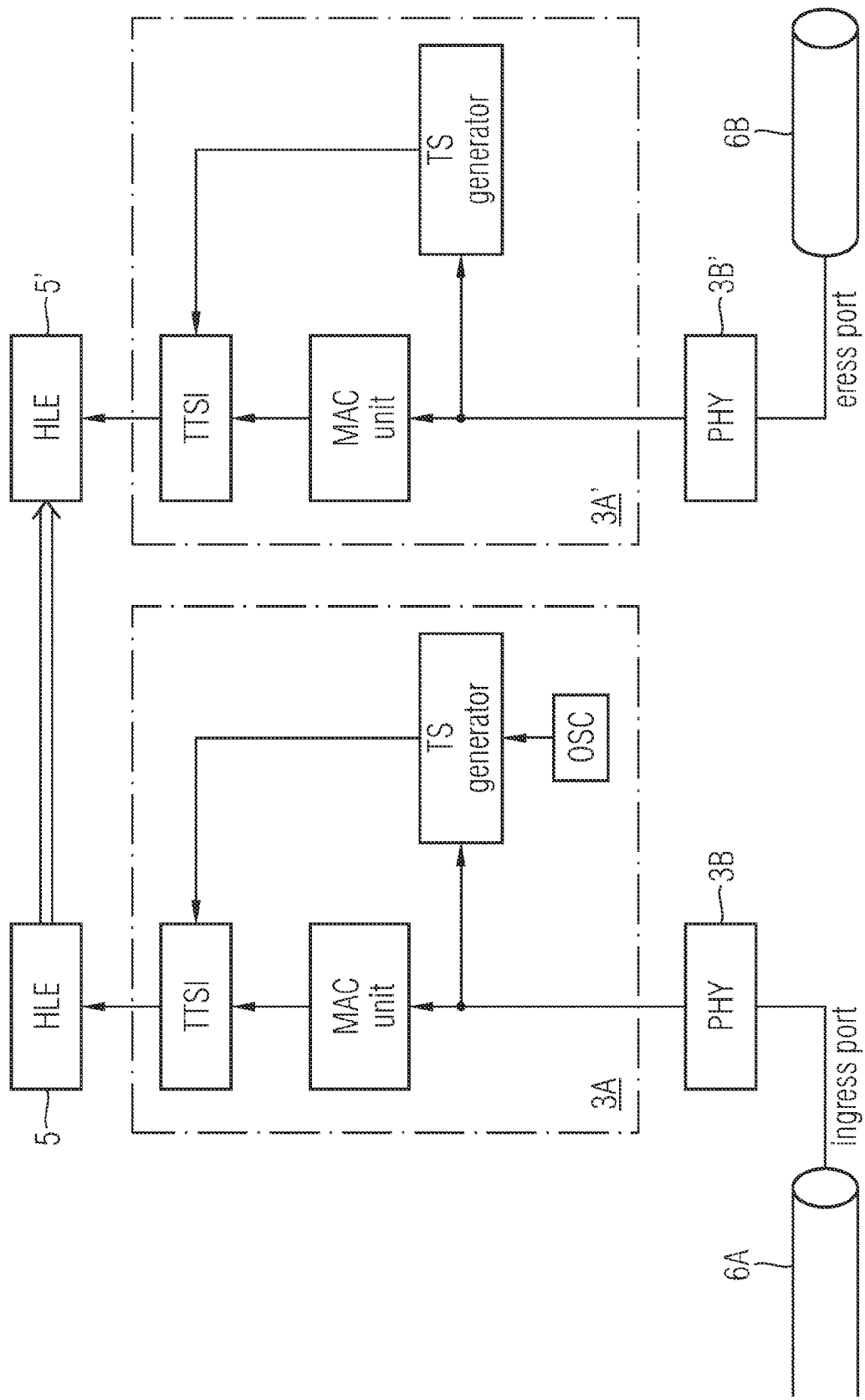
FIG. 4 shows a block diagram for illustrating an intermediate operation for a time tagged placement of an intermediate time aware device according to an embodiment of the present invention.

FIG. 4 shows a diagram for illustrating an intermediate operation of a time tag placement in an Ethernet MAC header within a single device comprising two ports, i.e. an ingress port and an egress port. The time aware intermediate device 3 comprises in the shown example of FIG. 4 an ingress port provided for receiving data packets via a data transport medium 6A and an egress port provided for forwarding data packets via a data transport medium 6B to the next device. The time aware intermediate device 3 as shown in FIG. 4 comprises at both ports a time tag processing unit 3A, 3A'. Both ports also comprise a physical transceiver 3B, 3B'. The first time tag processing unit 3A is connected to the ingress port via the physical transceiver 3B and the second time tag processing unit 3A' is connected to the egress port via the physical transceiver 3B'. Both time tag processing units 3A, 3A' can comprise an oscillator OSC, a time stamp generator, a time tag service interface TTSI as well as a MAC unit. The time stamp generator of the time tag processing unit 3A at the ingress port samples a local time source on detection of start of frame and sends this to the time tag function for population in the time tag data field TTDF. The time tag service interface TTSI of the time tag processing unit 3A populates the device time stamp field of the time tag within the header of the received data packet. After processing of the time tag data field TTDF the data packet is forwarded to a higher layer entity 5 integrated in the time aware device 3 or connected to the time aware device 3. The higher layer entity 5 uses a protocol such as NTP or 1588 PTP. The higher layer entity 5 can forward the packet internally, for example via a backplane connector, a switch or a processing device, to another higher layer entity 5' which forwards the data packet in turn to the time tag processing unit 3A' at the egress port of the time aware intermediate device 3 as shown in FIG. 4. The time tag processing unit 3A' generates a local time stamp of the port and calculates the residence time RT of the time tagged packet TDP by subtracting the device time stamp DTS within the tag time data field TTDF from the local port timestamp. Further, the time tag processing unit 3A' of the ingress port adds the residence time RT to the correction field CF of the tagged data packet TDP. Furthermore, the time tag processing unit 3A' of the ingress port can increment the hop count and recalculate the cyclic redundancy check CRC. In a possible embodiment the oscillators OSC of the time tag processing units 3A, 3A' can be frequency aligned.

In a possible embodiment of the invention the intermediate time aware device 3 operates in a single device operation mode wherein both time tag processing units 3A, 3A' of the time aware device 3 are activated to perform the processing of the time tagged data of the time tag data field TTDF. The residence time RT is calculated by subtracting the device time stamp (DTS) from the port time stamp (PTS). In such an intermediate device where the Ingress port and Egress port are used to capture the residence time RT of a single intermediate device, the value of the device time stamp (DTS) field of the time tag can be set back to zero (DTS=0) on transmission of the data packet from the processing unit 3A'. The value of the correction field (CF) is updated by adding the calculated residence time (RT).

$$RT := PTS - DTS$$

$$DTS = 0$$

$$CF := CF + RT,$$

Wherein RT is the residence time
  PTS is the port time stamp
  DTS is the device time stamp and
  CF is the correction field value.

In an alternative embodiment the intermediate time aware device 3 operates in a distributed operation mode where one of the two time tag processing units 3A, 3A' is deactivated, wherein the device time stamp DTS is set to the value of the port time stamp PTS and the correction field (CF) value remains unmodified.

$$DTS := PTS$$

$$CF := CF \text{ (unmodified)}$$

Figure 5:
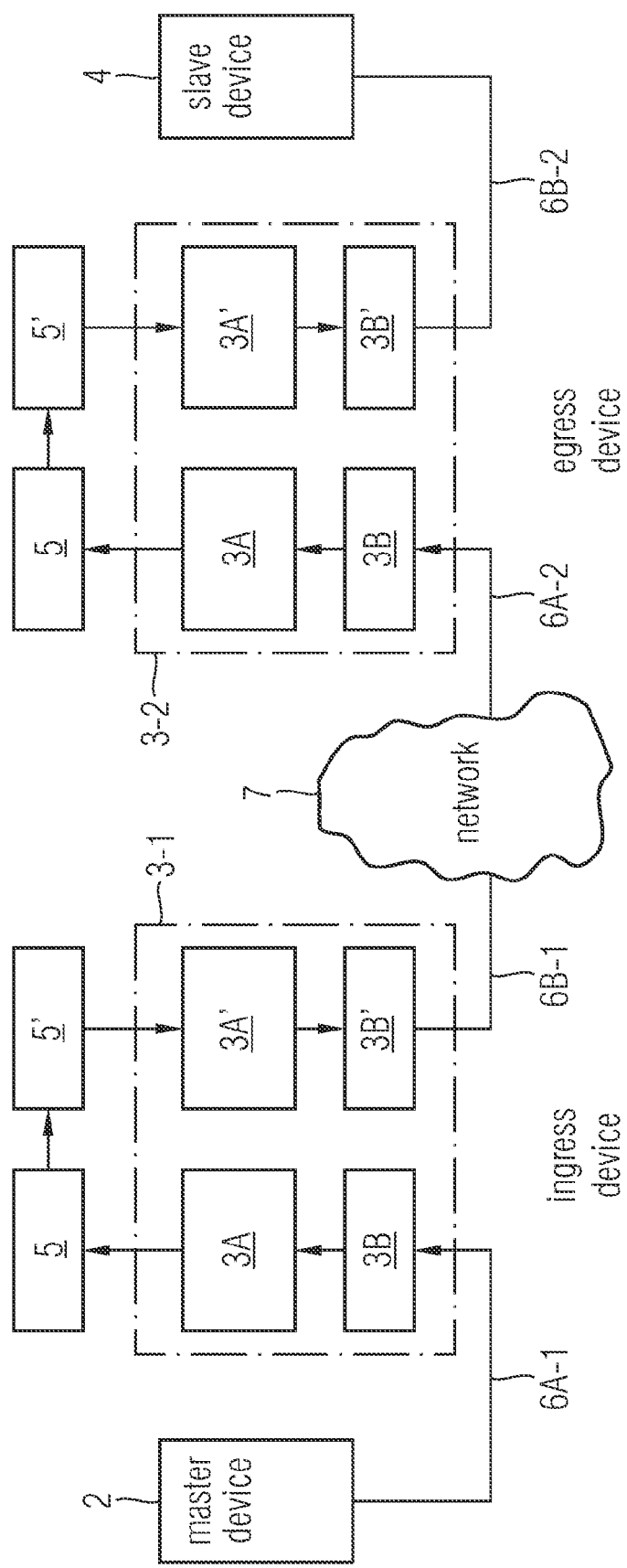
FIG. 5 shows a diagram for illustrating the processing of time tag data within two intermediate time aware devices acting as a gateway around a non-time aware packet switched network according to a specific embodiment of the present invention.

FIG. 5 shows a packet switched network 1 comprising two time aware intermediate devices 3 each having a first time tag processing unit 3A connected to an ingress port and a second time processing unit 3A' connected to an egress port. The first time aware intermediate device 3-1 in the shown example is connected by means of a data transport medium 6A-1 to a time aware master device 2 and by means of a second data transport medium 6B-1 to a time unaware network 7 consisting of intermediate devices which are not time aware, i.e. which do not comprise time tag processing units adapted to process time tag data of a predetermined time tag data field TTDF within a header of a data packet. The second time aware intermediate device 3-2 receives via a data transport medium 6A-2 data packets at an ingress port from the network 7. The second time aware intermediate device 3-2 which is connected at its egress port via a second data transport medium 6B-2 to a further device, e.g. a time aware slave device 4.

As shown in the example of FIG. 5 the first time aware intermediate device 3-1 is a special intermediate device forming the border to the network 7. The time aware intermediate device 3-1 forms an ingress device to the network 7. In the same way, the second time aware intermediate device 3-2 of the packet switched network 1 forms an egress device to the network 7. At the ingress device 3-1 the time tag processing unit 3A' at the egress port of the ingress device 3-1 is deactivated and only the time tag processing unit 3A at the ingress port of the ingress device 3-1 is activated for processing the time tagged data of the time tag data field TTDF within the data packets. At the egress device 3-2 the time tag processing unit 3A at the ingress port of the egress device 3-2 is deactivated whereas the time tag processing unit 3A' at the egress port of the egress device 3-2 is activated to process time tag data of the time tag data field TTDF within the data packet. The ingress device 3-1 and the egress device operate in the distributed operation mode wherein one of the two tag processing units of the respective device can be deactivated in response to an operation mode control signal in a possible embodiment.

The time tag service interface TTSI within the time tag processing unit 3A at the ingress device 3-1 populates the device time stamp (DTS) field within the time tag data field TTDF on receipt of a time tagged data packet TDP by the ingress device 3-1. The time tag processing unit 3A can determine that a tagged data packet TDP is received from a non-time aware network 7 if the value stored in the device time stamp (DTS) field is not zero. The time tag processing unit 3A' at the egress port of the egress device 3-2 calculates a network residence time NRT of the time tagged data packet TDP within the non-time aware network 7 using the device time stamp DTS within the time tag data field TTDF and the local port time stamp PTS generated on transmission of the data packet. The egress time tag processing unit 3A' of the egress port of the egress device 3-2 calculates the network residence time NRT of the tagged data packet TDP transported through the network 7 consisting of non-time aware devices by subtracting a remote ingress time stamp transported within the device time stamp (DTS) field of the tagged data packet TDP received by the egress device 3-2 from a local egress time stamp PTS generated by a local time stamp generator of said egress device 3-2. Further, the time tag processing unit 3A' of the egress device 3-2 adds the calculated value of the network residence time NRT to the correction field CF and increments the hop count. Further, the time tag processing unit 3A' of the egress port of the egress device 3-2 can recalculate the cyclic redundancy checksum CRC. As can be seen from FIG. 5 the distributed operation mode of a time aware intermediate device allows to incorporate a network 7 which does not comprise time aware devices and which is not able to process time tag data of a predetermined time tag data field.

Accordingly, the packet switched network 1 and system according to the present invention is downward compatible with existing networks not comprising the functionality of processing time tag data.

$$NRT := PTS - DTS$$

$$DTS = 0$$

$$CF := CF + NRT,$$

wherein NRT is the network residence time,
  PTS is the port time stamp
  DTS is the device time stamp and
  CF is the correction field value.

The time aware master device 2 as shown in FIG. 5 can be located close to a radio network controller RNC or a base station controller BSC. The time aware slave device 4 connected to the egress device 3-2 as shown in FIG. 5 is for example located in a base station or an eNodeB of a LTE system.

In a possible embodiment the slave device 4 can receive a data packet that was originally sent by a master device 2 or sent by an intermediate device 3 but which arrives via a device that is not time aware. The ingress device 3-1 and the egress device 3-2 acting as border devices or gateways for the non-time aware network 7 could also support a MPLS functionality.

Figure 6:
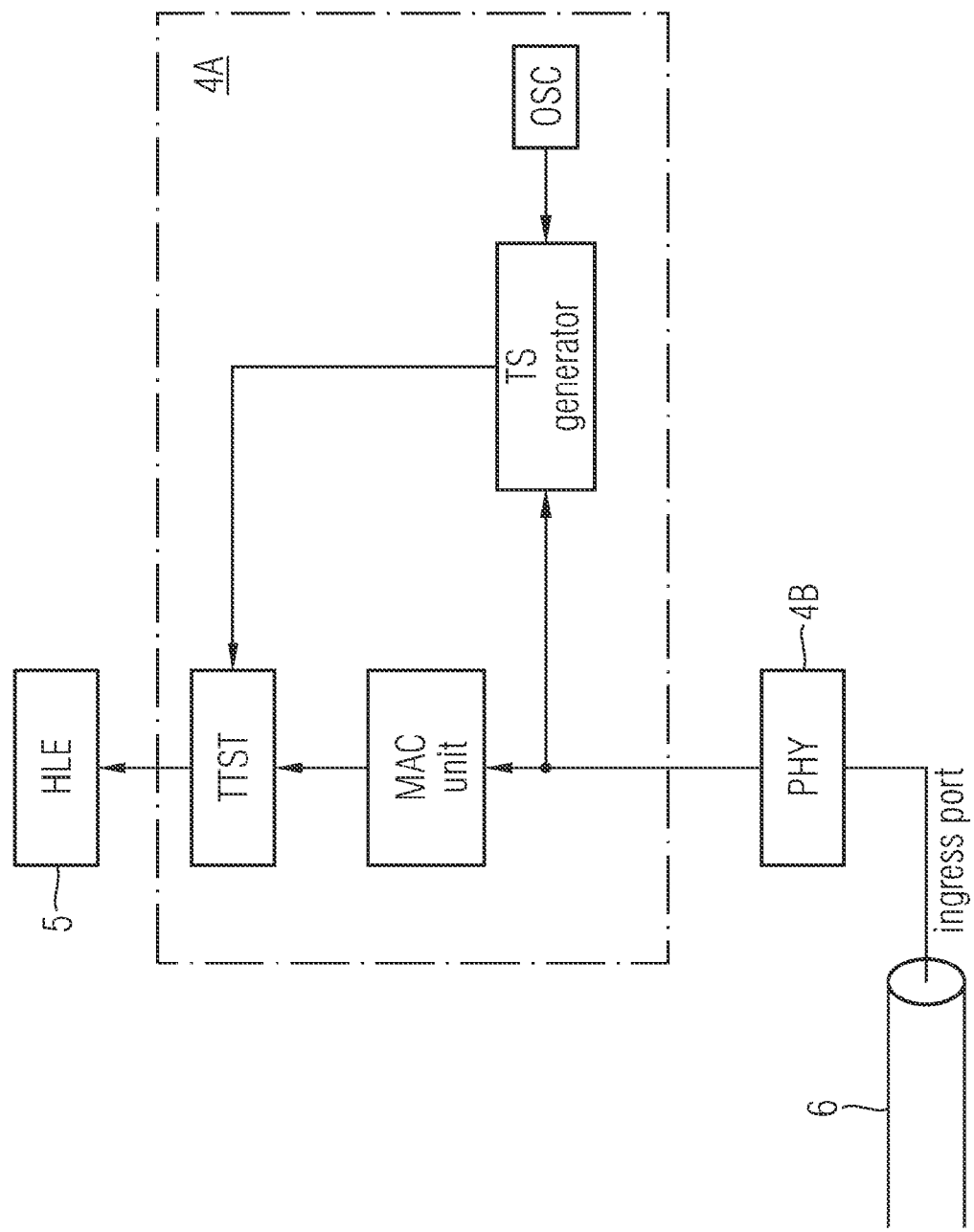
FIG. 6 shows a diagram for illustrating the processing of time tag data within a time aware slave device according to a possible embodiment of the present invention.

FIG. 6 shows a diagram for illustrating the operation of a time aware slave device 4 according to the distributed approach. The time aware slave device 4 receives a tagged data packet TDP at an ingress port via a physical transceiver 4B. The time aware slave device 4 can receive a tagged data packet TDP from a time aware intermediate device 3 or directly from a time aware master device 2 via a data transport medium 6. The time aware slave device 4 comprises a slave time tag processing unit 4A which provides an ingress port time stamp generated by a local time stamp generator upon reception of the data packet at the ingress port of the time aware slave device 4. For example, the time stamp generator samples a local time on detection of the start of frame of the received data packet. In the distributed operation mode, when the incoming device time stamp DTS of the incoming packet is non zero (DTS>0), the network residence time NRT is calculated by subtracting the device time stamp DTS from the local time stamp, i.e. the port time stamp PTS (NRT:=PTS−DTS).

The value in the correction field CF is updated by adding the calculated network residence time NRT to the delay value stored in the correction field CF of the time tag data field TTDF of the tagged data packet TDP (CF:=CF+NRT)

The time tag service interface TTSI of the slave time tag processing unit 4A provides accurate information to the higher layer entity 5 provided within the time aware slave device 4 or connected to the time aware slave device 4. The time tag service interface TTSI of the time tag processing unit 4A can further remove the Ethertype and time tag data field TTDF after the destination address (DA)/source address (SA) field of the MAC header. Further, the time tag service interface TTSI can recalculate the CRC data packet. The slave time tag processing unit 4A of a time aware slave device 4 can check whether the received data packet received at the ingress port is a tagged data packet TDP which comprises is a time tag data field TTDF in its header or not. If the received data packet is not a tagged data packet this data packet DP can be forwarded directly by the slave time tag processing unit 4A to the higher layer entity 5 as shown in FIG. 6. If the received data packet is a tagged data packet TDP having a time tag tag data field TTDF it will be decided whether the device time stamp DTS of the received tagged data packet is zero or not. The master which connects to a downstream intermediate device over a non-time tag aware network can also use the device time stamp, along with an intermediate egress function at the other side of the network 7. If the device time stamp DTS value is not zero, a network residence time NRT is calculated by subtracting the device time stamp DTS from the port time stamp PTS value (NRT:=PTS−DTS). The correction field CF is updated by adding the calculated network residence time NRT to the correction field CF value of the received data packet (CF:=CF+NRT). The device time stamp DTS is zero (DTS=0) if the intermediate device 3 has measured RT for a single device—in which case the Slave does not need to calculate the residence time RT. If the device time stamp DTS is not zero (DTS>0), then the slave device 4 needs to close the distributed network 7 and does calculate the network residence time NRT.

After the initial check on the device time stamp field DTS and if needed, the subsequent residence time calculation, the device time stamp (DTS) field is overwritten within processing unit 4A with the value of the local port time stamp PTS of the slave device 4 (DTS:=PTS).

Figure 7:
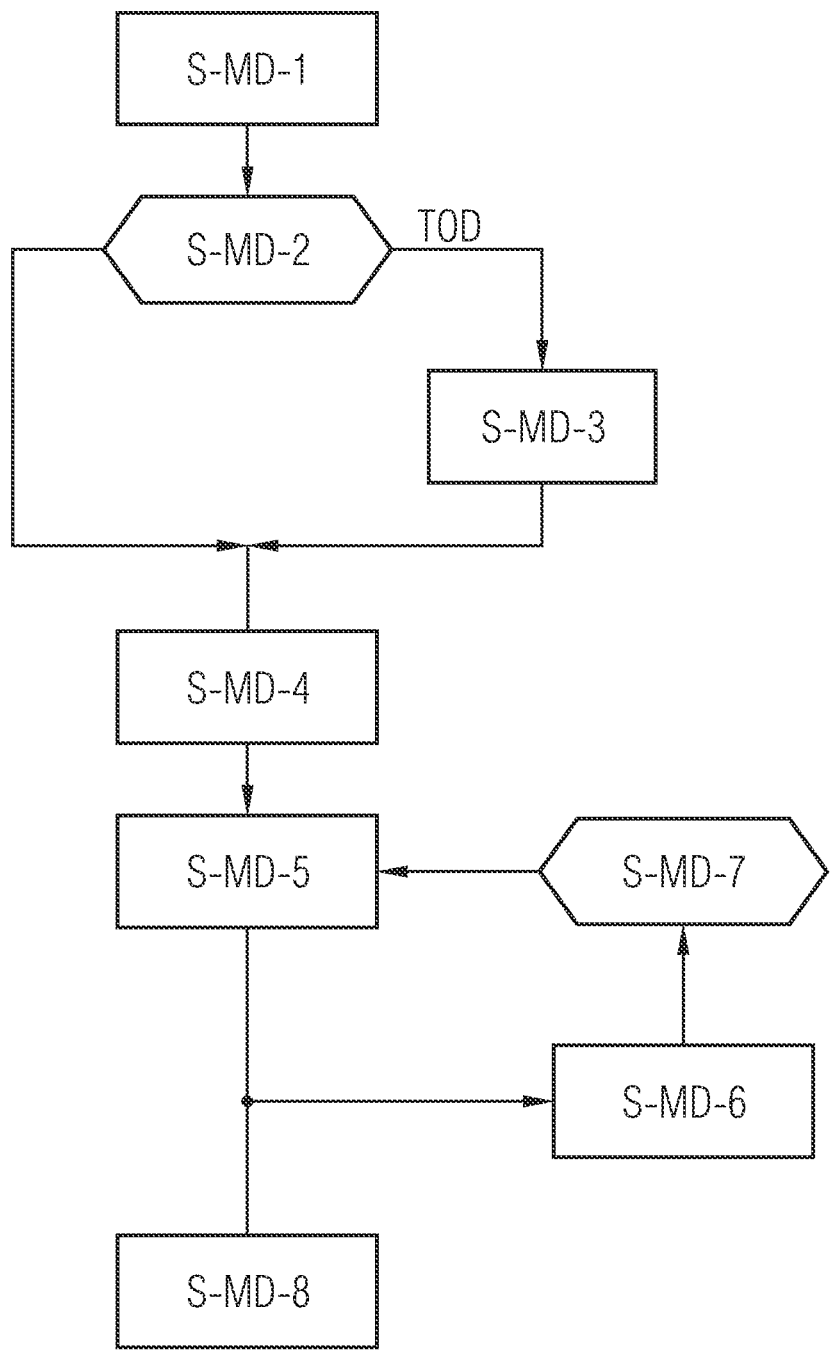
FIG. 7 shows a flow chart for illustrating the processing of time tag data within a time aware master device according to a possible embodiment of the present invention.

FIG. 7 shows a flow chart illustrating the process within a time aware master device (MD) 2.

In a first step S-MD-1 the time aware master device 2 receives a data packet DP from a higher layer entity 5 such as illustrated also in FIG. 3. In a further step S-MD-2 the time tag processing unit 2A of the time aware master device 2 inspects the received data packet DP and checks whether the data packet is a time of day (TOD) event message or not. If the received packet is a time of day event message TOD the time tag processing unit 2A inserts the Ethertype and time tag data field TTDF into the layer 2 header of the data packet DP in step S-MD-3. In a further step S-MD-4 the data packet is then sent to the MAC layer and is processed by the MAC unit in step S-MD-5.

If a start of frame has been detected in step S-MD-6 the time stamp is generated on the basis of a master clock MC. The process puts the generated time stamp as the source time stamp in the field in the MAC header time tag thus avoiding a possible manipulation of layer 3 payload. In a further step S-MD-7 it is checked whether a time tag is in place. Then the source time stamp field is populated. In step S-MD-8 the CRC is recalculated and the tagged data packet TDP is transmitted via the data transport medium 6 to the next device.

Figure 8:
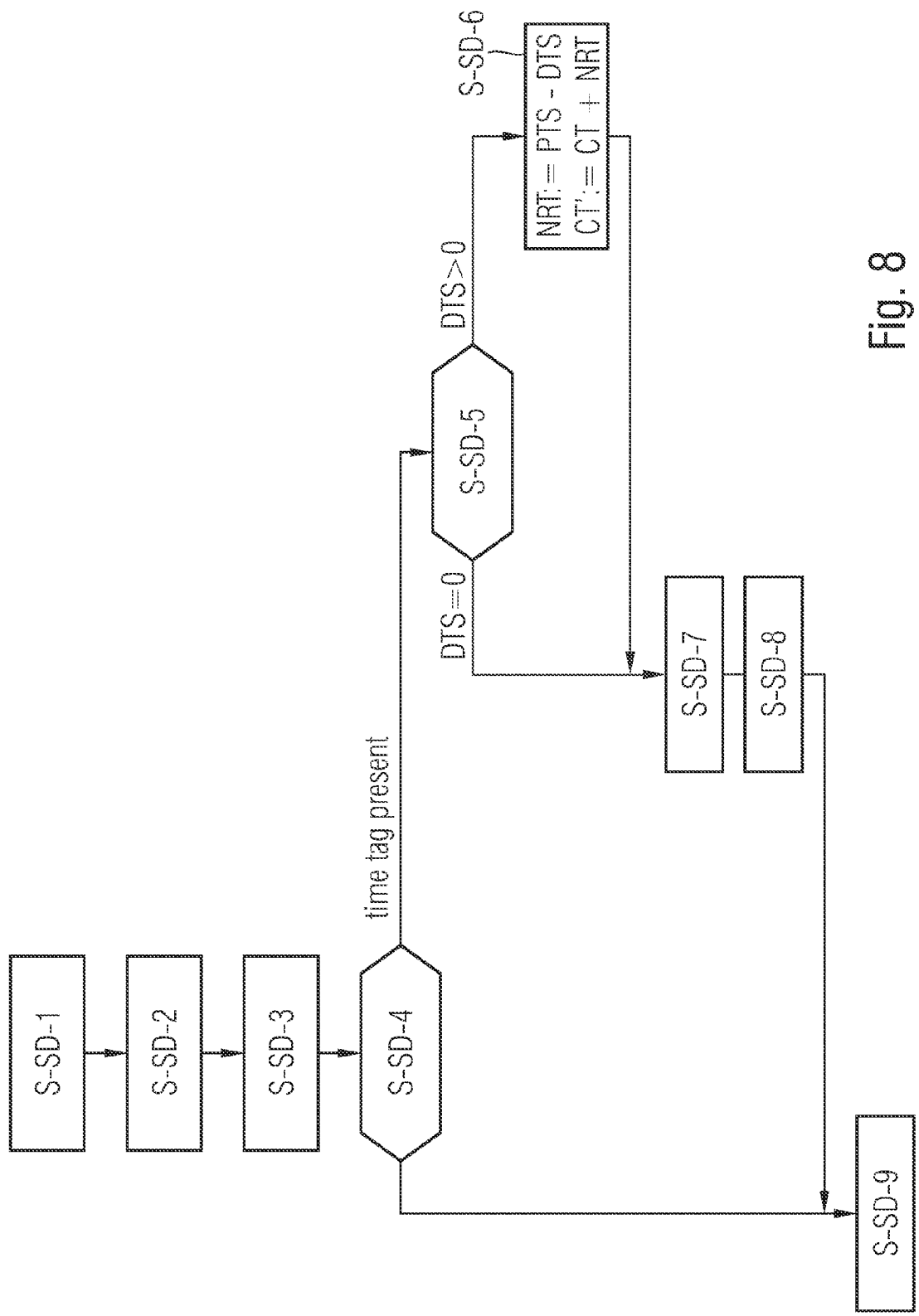
FIG. 8 shows a flow chart for illustrating the processing of time tag data within a time aware slave device according to a possible embodiment of the present invention.

FIG. 8 shows a flow chart of a process within a time aware slave device 4. In a first step S-SD-1 a slave device 4 receives a data packet from a data transport medium 6. In step S-SD-2 a start of frame delimiter SFD is detected and a port time stamp PTS is generated. The received data packet is processed by the MAC unit of the slave time tag processing unit 4A in step S-SD-3. In a further step S-SD-4 the time tag service interface TTSI detects whether a time tag is present in the received data packet. If a time tag is present it is checked in step S-SD-5 whether the device time stamp DTS is zero or not. If the device time stamp DTS is not zero (DTS>0) which indicates that the received tagged data packet (TDP) has been transported through a non-time aware network 7 a network a residence time NRT is calculated by subtracting the device time stamp DTS from the port time stamp PTS in step S-SD-6. Further, in step S-SD-6 the correction field CF is updated by adding the calculated network residence time NRT to the delay value stored in the correction field CF of the time tag data field TTDF of the received tagged data packet TDP.

NRT:=PTS−DTS

CF:=CF+NRT

If the device time stamp DTS is not zero (DTS>0) the slave device 4 is at the remote/egress side of a non-time aware network 7. After processing of the device time stamp DTS and calculation of the network residence time RT, the port time stamp PTS is put into the device time stamp field in step S-SD-7 (DTS:=PTS).

In step S-SD-8 the source time stamp STS and device time stamp DTS can be used to populate the TS1 and TS2 timestamp fields of the 1588 protocol as part of the payload. Also the correction field CF can be copied. In a further step S-SD-9 the data packet processed by the slave time tag processing unit 4A can be forwarded to a higher layer entity 5 using higher layer protocols such as 1588 or NTP protocol.

Figure 9:
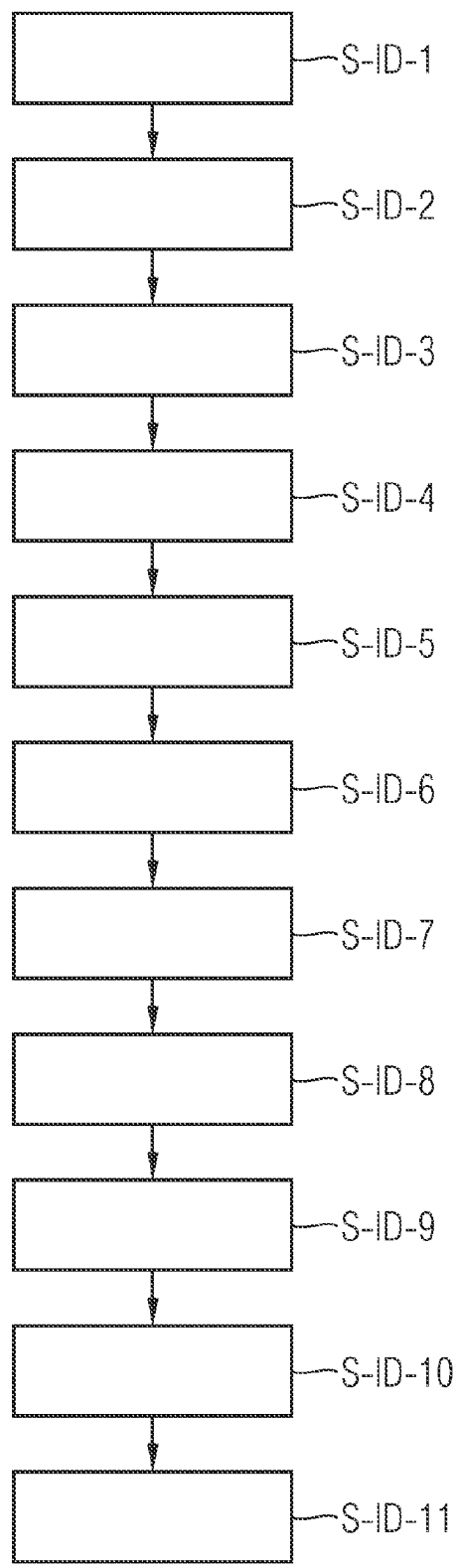
FIG. 9 shows a flow chart for illustrating the processing of time tag data within an intermediate time aware device according to a possible embodiment of the present invention.

FIG. 9 shows a flow chart for illustrating the processing of a data packet DP within an intermediate time aware device 3 operating in a single operation mode as a single device. In the single operation mode both time tag processing units 3A, 3A' of the time aware intermediate device 3 are activated. In a first step S-ID-1 the data packet is received by the time aware intermediate device at an ingress port. In step SS-ID-2 the start of frame delimiter of the received data packet is detected to generate a time stamp. The received packet is processed by the MAC unit of the time tag processing unit 3A of the ingress port in step S-ID-3. The time stamp generated in step S-ID-2 is used to populate the device time stamp field in the time tag data field TTDF in step S-ID-4. After having processed the time tag data field TTDF the data packet is forwarded in step S-ID-S to the higher layer entity 5 which forwards the data packet internally from the ingress port to the egress port, e.g. via a back plane connector, a data processing unit or a packet switch device of intermediate time aware device 3. The data packet received at the higher layer entity 5' in step S-ID-6 is sent in step S-ID-7 to the MAC layer and processed by the MAC unit of the time tag processing unit 3A' at the egress port in step S-ID-8. In step S-ID-9 the start of frame delimiter SFD of the outgoing packet is detected and a local clock is sampled to generate a time stamp. If the time tag is in place the residence time RT is calculated by subtracting the device time stamp DTS from the port time stamp PTS, and the device time stamp DTS is set to zero. Further, the correction field CF is updated in step S-ID-10. In Step S-ID-11 the CRC can be calculated and the processed data packet is transmitted by the intermediate time aware device 3 via the transport medium in step S-ID-11 to the next device.

Figure 10:
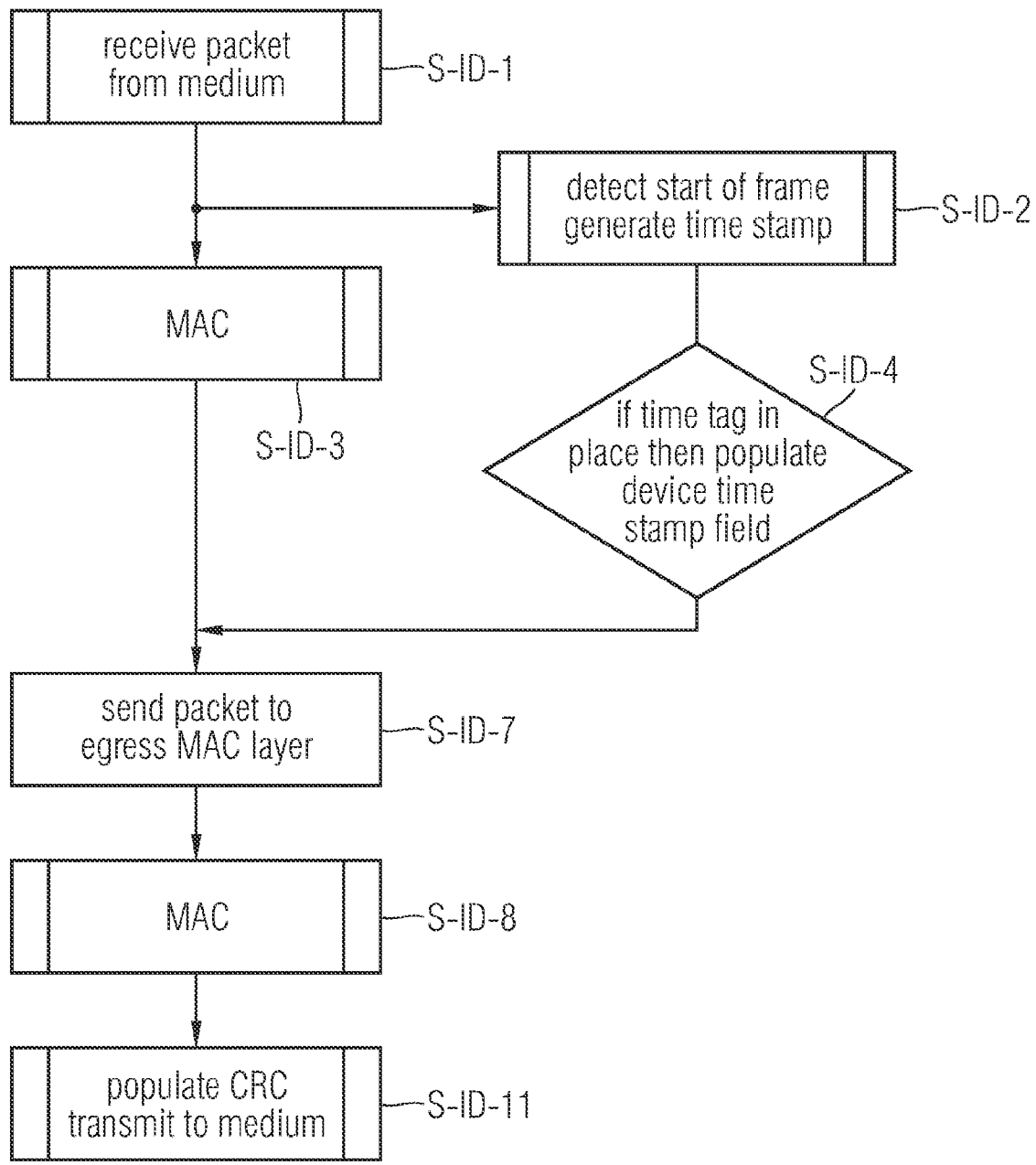
FIG. 10 shows a flow chart for illustrating the processing of time tag data within an intermediate time aware device according to a possible embodiment of the present invention.
Figure 11:
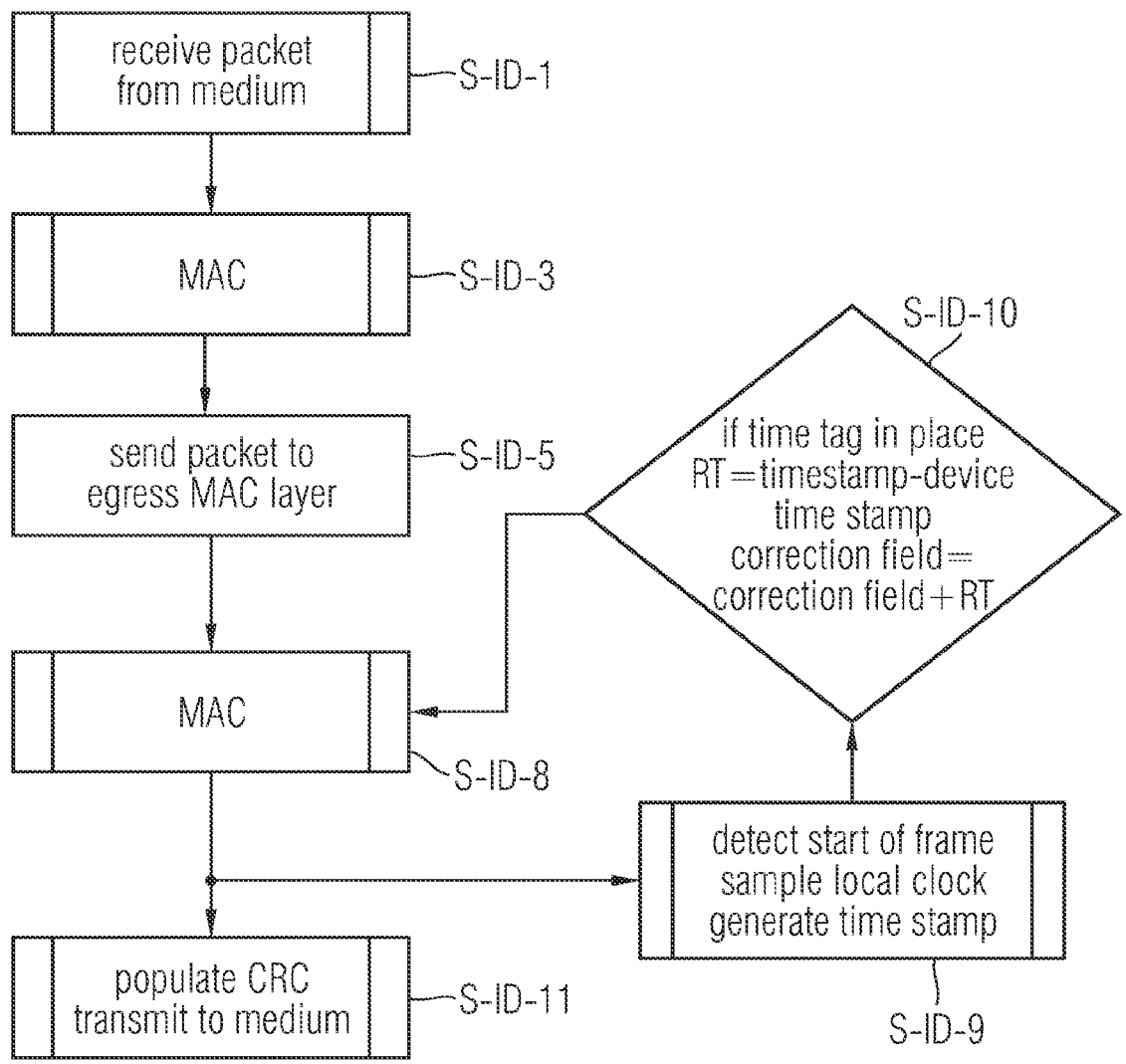
FIG. 11 shows a flow chart for illustrating the processing of time tag data within an intermediate time aware device according to a possible embodiment of the present invention.

FIG. 10 shows a flow chart for illustrating the processing of a data packet by an intermediate time aware device 3 operating in the distributed operation mode. In the distributed operation mode only one of the two time tagged processing units 3A, 3A' is activated. The flow chart is similar to the flow chart of FIG. 9 but some steps are omitted. In step S-ID-7 the data packet is sent to the egress MAC layer and forwarded to the MAC layer unit in S-ID-8 of the time tag processing unit at the egress port. Whereas FIG. 10 shows a flow chart for the distributed ingress FIG. 11 shows a flow chart for illustrating the processing of a data packet of an intermediate time aware device 3 for a distributed egress. The flow chart is similar to the flow chart shown in FIG. 9. In step S-ID-5 the data packet is sent to the egress MAC layer.

With the apparatus and method according to the present invention it is possible to transport time stamps and time measurement fields within a layer 2 header of a data packet and incorporate functions to improve traceability of time information exchanged in data packets. The method and system can support security and integrity using a MAC layer security as defined by 802.1. It may be implemented in distributed switches. The method further supports a possible migration to a network wide model of a transparent clock since the ingress time stamp can be preserved across a chain of devices within the packet switched network 1. Further, with the method and apparatus according to the present invention a common time tag can be used by any time distribution protocol. If the time tag data field TTDF sits early in the data packet any overhead associated with deep packet inspections is avoided. The method and apparatus according to the present invention removes the necessity for a device to recalculate numerous checksums including the IP/UDP checksum within the payload of a data packet. Any layer violations are removed and the need for time protocol packets to be decrypted in order to be modified can be reduced. Accordingly, it is possible that the customer traffic transported within the payload can be encrypted in an isolated manner from the time protocol fields. The method and apparatus according to the present invention can be used for any packet switched network 1 and in particular for a mobile phone network but also for smart power distribution networks.

The invention claimed is:

1. A time aware device for a packet switched network, comprising:
   at least one time tag processing unit, which processes time tag data of a predetermined time tag data field provided within a header of a tagged data packet transported in said packet switched network to provide time related information reflecting a delay undergone by said tagged data packet during its transport in said packet switched network,
   wherein said header is a layer-two-Ethernet header of a tagged Ethernet packet transported in said packet switched network and said header comprising a destination address and a source address;
   wherein said predetermined time tag data field provided within the header follows directly both said destination address and said source address, and
   wherein said predetermined time tag data field is processed first by said at least one time tag processing unit;
   a local time stamp generator for generating a local time stamp, and at least one ingress port,
   wherein said local time stamp is stored by said at least one time tag processing unit in a device time stamp field comprised by said predetermined time tag data field of a time tagged data packet received at said ingress port,
   wherein said predetermined time tag data field includes a traceability field, and
   wherein said traceability field comprises a hop count field storing a hop counter incremented by the time aware device, said time aware device modifying the time stamp within said predetermined time tag data field.

2. The time aware device according to claim 1, wherein said at least one time tag processing unit processes said time tag data of the predetermined time tag data field provided within the layer-two-Ethernet header of a tagged Ethernet packet transported in said packet switched network.

3. The time aware device according to claim 2, the predetermined time tag data field further comprising:
   an Ethertype field indicating the type of the Ethernet protocol of said tagged data packet;
   a source time stamp field which stores a time stamp provided by a time aware master device having inserted the time tag data field into said layer-two-Ethernet header of said data packet;
   a device time stamp field which stores a device time stamp of the time aware device indicating a local time of the time aware device when the data packet is received at an ingress port of said time aware device; and
   a correction field which stores an accumulated delay value indicating the delay undergone by said tagged data packet during its transport in said packet switched network.

4. The time aware device according to claim 3, the predetermined time tag data field further comprising:
   a time tag identifier field, and
   a time tag type field.

5. A time aware device for a packet switched network comprising:
   at least one time tag processing unit adapted to process time tag data of a predetermined time tag data field provided within a header of a tagged data packet transported in said packet switched network to provide time related information reflecting a delay undergone by said tagged data packet during its transport in said packet switched network,
   wherein said header comprises a destination address and a source address, and
   wherein said predetermined time tag data field provided within the header follows directly both said destination address and said source address;
   a local time stamp generator for generating a local time stamp, and
   at least one ingress port, wherein said local time stamp is stored by said at least one time tag processing unit in a device stamp field comprised by said predetermined time tag data field of a time tagged data packet received at said ingress port;

wherein said time tag processing unit detects a residence time of said data packet caused by an internal passage and/or processing of the data packet in the time aware device or network by comparing a local time stamp generated by the local time stamp generator of said time aware device with a time stamp read from the device time stamp field of the tagged data packet at an egress port of said time aware device or network.

6. The time aware device according to claim 5, wherein said time tag processing unit adds the detected residence time to the delay value stored in the correction field of the time tag data field of the respective tagged data packet.

7. The time aware device according to claim 3, wherein said time aware device is a time aware master device which receives a data packet from a higher layer entity and forwards a tagged data packet to a time aware intermediate device or a time aware slave device wherein said time aware master device comprises a master time tag processing unit which inserts said time tag data field into the header of the received data packet and puts a time stamp derived from a master clock into the source time stamp field of the inserted time tag data field to provide the tagged data packet.

8. A packet switched network comprising at least one time aware master device according to claim 7,
at least one time aware intermediate device wherein said time aware device is a time aware intermediate device which forwards a tagged data packet received from a time aware master device or from a previous intermediate time aware device to a following intermediate time aware device or a time aware slave device; and
at least one time aware slave device which receives a tagged data packet from a time aware intermediate device or from a time aware master device,
wherein said time aware slave device comprises a slave time tag processing unit which provides an ingress port time stamp generated by a local time stamp generator upon reception of the data packet at an ingress port of said time aware slave device.

9. The packet switched network according to claim 8, wherein said packet switched network is a mobile phone network having base station controllers comprising a time aware master device and base stations comprising a time aware slave device.

10. The time aware device according to claim 3, wherein said time aware device is a time aware intermediate device which forwards a tagged data packet received from a time aware master device or from a previous intermediate time aware device to a following intermediate time aware device or a time aware slave device.

11. A time aware device for a packet switched network comprising:
at least one time tag processing unit adapted to process time tag data of a predetermined time tag data field provided within a header of a tagged data packet transported in said packet switched network to provide time related information reflecting a delay undergone by said tagged data packet during its transport in said packet switched network,
wherein said header comprises a destination address and a source address, and wherein said predetermined time tag data field provided within the header follows directly both said destination address and said source address;
a local time stamp generator for generating a local time stamp, and
at least one ingress port,
wherein said local time stamp is stored by said at least one time tag processing unit in a device time stamp field comprised by said predetermined time tag data field of a time tagged data packet received at said ingress port;
wherein said time aware device is a time aware intermediate device which forwards a tagged data packet received from a time aware master device or from a previous intermediate time aware device to a following intermediate time aware device or a time aware slave device;
wherein the time aware intermediate device comprises an ingress unit having an ingress time tag processing unit which checks whether a data packet received at an ingress port of said ingress unit is a tagged data packet which comprises a time tag data field in its header and stores a local ingress time stamp generated by a local time stamp generator of said ingress unit in the device time stamp field of the time tag data field if a time tag data field is provided within the header of the received data packet.

12. The time aware device according to claim 11, wherein the time aware intermediate device comprises an egress unit having an egress time tag processing unit which calculates a single device residence time of the tagged data packet within the time aware intermediate device depending on the ingress time stamp and a local egress time stamp generated by a local time stamp generator of the egress unit and which adds the calculated single device residence time to the accumulated delay value stored in the correction field of the time tag data field of the received tagged data packet, and eventually resetting the device time stamp field to zero.

13. The time aware device according to claim 11, wherein the time aware intermediate device comprises an egress device having an egress time tag processing unit which calculates a network residence time (NRT) of the tagged data packet transported through a network which comprises non-time aware devices to said egress device by subtracting a remote ingress time stamp stored by an ingress time tag processing unit of an ingress unit and transported within the device time stamp field of the tagged data packet through said network from a local egress time stamp generated by a local time stamp generator of said egress time tag processing unit and which adds the calculated network residence time (NRT) to the accumulated delay value stored in the correction field of the tagged data packet received by said egress device from said network of non-time ware devices, and eventually resetting the device time stamp field to zero.

14. The time aware device according to claim 13, said traceability field further comprising:
at least one address field which stores a MAC address of the last time aware device or of all previous time aware devices which have modified a time stamp within said time tag data field,
a traceability clock field for a Primary Reference Clock or Grandmaster Clock and
a fault signalling field.

15. A time aware device for a packet switched network comprising:
at least one time tag processing unit adapted to process time tag data of a predetermined time tag data field provided within a header of a tagged data packet transported in said packet switched network to provide time related information reflecting a delay undergone by said tagged data packet during its transport in said packet switched network, wherein said header said header comprises a destination address and a source address, and wherein said predetermined time tag data field provided within the header follows directly both said destination address and said source address;

a local time stamp generator for generating a local time stamp, and at least one ingress port, wherein said local time stamp is stored by said at least one time tag processing unit in a device time stamp field comprised by said predetermined time tag data field of a time tagged data packet received at said ingress port;

wherein said time aware device is a time aware slave device which receives a tagged data packet from a time aware intermediate device or from a time aware master device, wherein said time aware slave device comprises a slave time tag processing unit which provides an ingress port time stamp generated by a local time stamp generator upon reception of the data packet at an ingress port of said time aware slave device.

16. The time aware device according to claim 15,
wherein said slave time tag processing unit of said time aware slave device checks whether the data packet received at the ingress port of said time aware slave device is a tagged data packet which comprises a time tag data field in its header, wherein if the received data packet is a tagged data packet said slave time tag processing unit inserts the ingress port time stamp of the slave device into the device time stamp field of the tagged data packet in case that the time aware slave device has received the tagged data packet with the device time stamp being equal to zero, wherein if the received data packet is a tagged data packet said slave time tag processing unit calculates a residence time by subtracting a device time stamp from the ingress port time stamp of the slave device and adds the calculated residence time to the delay value stored in the correction field of the time tag data field of the tagged data packet in case that the time aware slave device has received the tagged data packet with a non zero value of the device time stamp, and wherein if the received data packet is not a tagged data packet the data packet is forwarded directly by said slave time tag processing unit of said time aware slave device to a higher layer entity.

17. A method for transporting time related information in a packet switched network having time aware devices comprising the steps of:

receiving a data packet from a higher layer entity by a time aware master device which inserts a time tag data field into the header of the received data packet to provide a tagged data packet, forwarding the tagged data packet directly or via a time aware intermediate device to a time aware slave device which does process the time tag data of the time tag data field provided within the header of the tagged data packet to provide time related information reflecting a delay undergone by said tagged data packet during its transport in said packet switched network wherein said header is a layer-two-Ethernet header of a tagged Ethernet packet transported in said packet switched network and said header comprising a destination address and a source address;

wherein said predetermined time tag data field inserted into the header follows directly both said destination address and said source address, and wherein said predetermined time tag data field is processed first by said at least one time tag processing unit; and generating a local time stamp, and wherein said local time stamp is stored by at least one time tag processing unity in a device time stamp field comprised by said predetermined time tag data field of a time tagged data packet received at an ingress port of the time aware devices, and wherein said predetermined time tag data field includes a traceability field, and wherein said traceability field comprises a hop count field storing a hop counter incremented by the time aware device, said time aware device modifying the time stamp within said predetermined time tag data field.

* * * * *